UNITED STATES PATENT OFFICE.

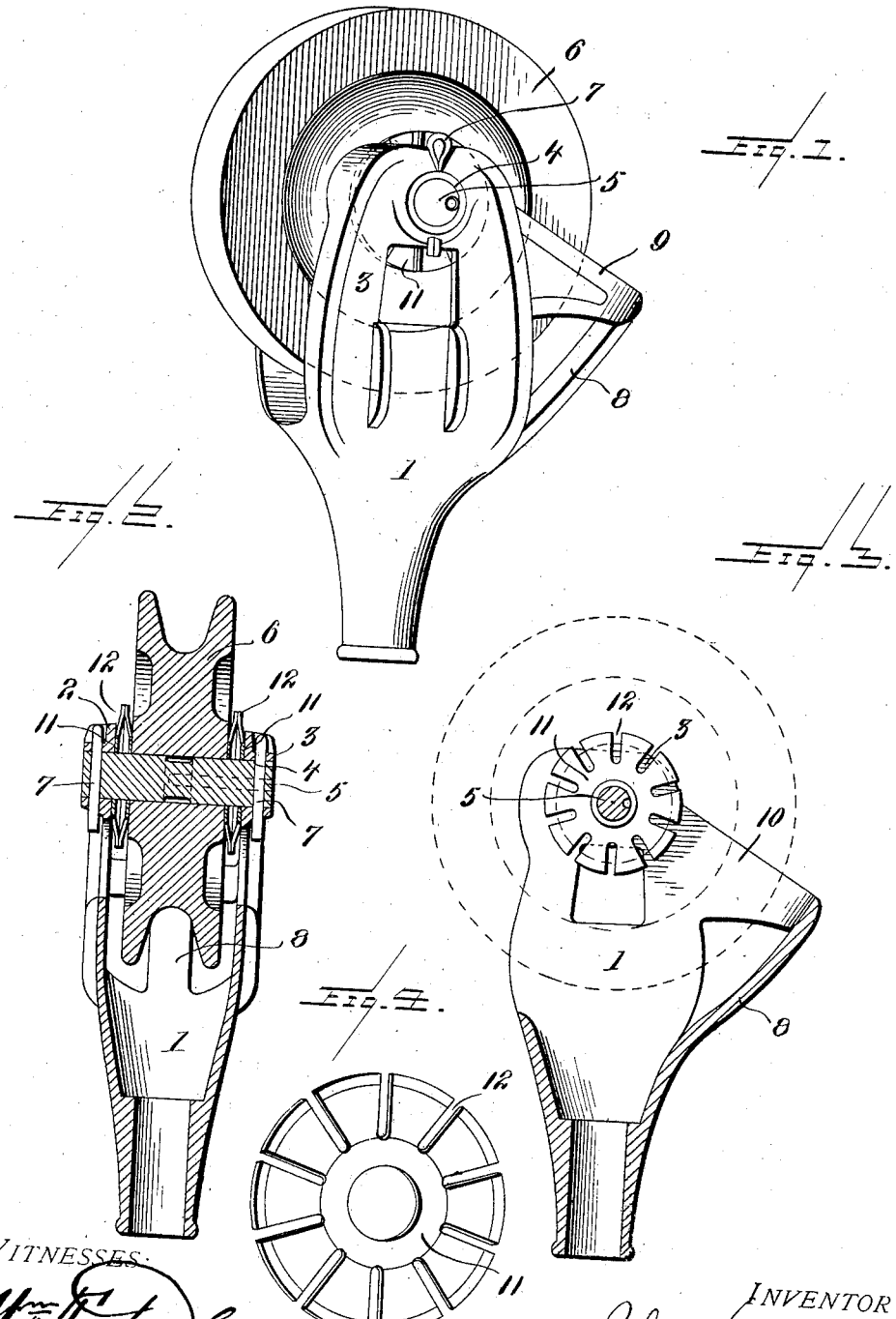

JOHN HENSLEY, OF HUNTINGTON, INDIANA.

TROLLEY-HARP.

No. 859,449.

Specification of Letters Patent.

Patented July 9, 1907.

Application filed October 25, 1906. Serial No. 340,474.

*To all whom it may concern:*

Be it known that I, JOHN HENSLEY, a citizen of the United States, residing at Huntington, in the county of Huntington and State of Indiana, have invented a new and useful Improvement in Trolley-Harps, of which the following is a specification.

My invention relates to improvements in trolley harps.

The object of my invention is to provide a trolley harp having a guard to prevent the trolley wheel from coming down on top of the wire when trying to replace it after it has left the wire.

Another object of my invention is to provide a trolley harp having an inwardly turned guard at the outer sides of the harp and extending upwardly, so as to prevent the trolley wire from coming in contact with the contact spring, when the wheel leaves the wire or in replacing the wheel on the wire when the wheel has left the said wire.

Still a further object of my invention is to provide a spring contact between the arms of the harp and the hub of the wheel, whereby a better electrical contact is made.

In the accompanying drawings; Figure 1 is a perspective view of my improved harp, showing the trolley wheel mounted therein; Fig. 2 is a transverse vertical sectional view of Fig. 1. Fig. 3 is a longitudinal vertical sectional view; and Fig. 4 is a perspective view of one of the contact springs detached.

Referring now to the drawings, 1 represents my improved harp which is constructed in the usual form and having the arms 2 and 3. The outer ends of the said arms are provided with openings 4 in which is mounted the shaft 5 of the trolley wheel 6, the said shaft being held against rotation within the arms by means of the cotter pins 7, this being the preferred form of holding the shaft against rotation and longitudinal movement. The outer ends of said arms are also provided with guards extending upward and inwardly turned so as to prevent the trolley wire from coming in contact with the contact spring when the wheel leaves the wire, or in replacing said wheel when it has left the wire.

The harp 1, adjacent to the inner ends of the arms 2 and 3, is provided with an obliquely arranged arm 8, which has secured to its outer end the laterally and upwardly extending members 9 and 10. The upper ends of the said members are secured to the arms 2 and 3 adjacent their outer ends leaving space between the members for the free rotation of the trolley wheel. These members extend in a downward direction from the lower edge of the arms and being connected to the arms, 8, form a shield or guard surrounding the trolley wheel. By this arrangement it will be seen that when the wheel jumps the trolley wire and passes upwardly over the same, the wheel cannot engage the upper face of the trolley wire in drawing the pole downwardly to replace the wheel under the trolley wire. It often happens that the wheel is riding on top of the wire when a cross span wire is reached and the harp will cut or break the wire, and to avoid this is the object of my guard.

The trolley wheel 6 is loosely mounted upon the shaft 5 and receives or forms an electrical contact through the arms 2 and 3, and in order to form a more perfect contact between the wheel and the harp, I provide the shaft 5 on each side of the trolley wheel with two oppositely arranged disk-shaped spring contact washers, 11. These washers, as before stated, are disk-shaped, having a flat central portion to bear evenly against the hub of the wheel or the arm of the harp. Commencing at the said flat portion and extending radially outwardly to the periphery of the washers are cut-away portions 12, which form a more yielding washer. The said washers are arranged in pairs on each side of the trolley wheel and have their concave faces abutting and thus the flat straight portion of the two washers bear respectively upon the hub of the wheel and one arm of the harp.

Having thus fully described my invention, what I claim as new and desire to secure by Letters Patent is:

1. The combination with a trolley harp comprising two arms and a wheel mounted between said arms, of dish-shaped washers arranged in pairs on each side of the wheel and having their concaved faces abutting, and a frame carried on the lower side of the arms of the harp, and inwardly turned guards on the upper side of said arms adapted to prevent the trolley wire from coming into contact with the lower side of the trolley wheel and the washers, respectively.

2. The combination with a trolley harp comprising two arms, a shaft mounted on said arms, and a wheel mounted on the shaft between the arms, of dish-shaped washers arranged in pairs on the shaft on each side of the wheel and having their concaved faces abutting, substantially as described.

3. The combination with a trolley harp comprising two arms, a shaft mounted in said arms, and a wheel loosely mounted on the shaft between the arms, of dish-shaped washers arranged in pairs on the shaft on each side of the wheel and having their concaved faces abutting, the said washers having their flattened central portions bearing against the wheel and the arms of the harp, and the said washers also having slots commencing at the flattened portion and extending radially through the periphery of the washer.

In testimony whereof I have signed my name to this specification in the presence of two subscribing witnesses.

JOHN HENSLEY.

Witnesses:
W. N. HAMPTON,
EBEN LESH.